(12) United States Patent
Sapper et al.

(10) Patent No.: US 8,342,462 B2
(45) Date of Patent: Jan. 1, 2013

(54) SUPPORT APPARATUS

(75) Inventors: Richard Sapper, Milan (IT); Ronald Snyder, Macungie, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 13/153,316

(22) Filed: Jun. 3, 2011

(65) Prior Publication Data

US 2011/0303800 A1 Dec. 15, 2011

Related U.S. Application Data

(60) Provisional application No. 61/353,714, filed on Jun. 11, 2010.

(51) Int. Cl.
*A47F 3/00* (2006.01)
(52) U.S. Cl. ............... 248/124.1; 248/405; 248/920; 361/679.22
(58) Field of Classification Search ............ 361/679.21, 361/679.22, 679.27; 248/917, 393, 371, 248/122.1, 124.1
See application file for complete search history.

(56) References Cited

U.S. PATENT DOCUMENTS

| | | | |
|---|---|---|---|
| 2,737,709 A * | 3/1956 | Lovelace | 269/47 |
| 5,553,820 A | 9/1996 | Karten et al. | |
| 5,687,939 A | 11/1997 | Moscovitch | |
| 5,772,174 A | 6/1998 | Hirsch et al. | |
| 5,992,809 A | 11/1999 | Sweere et al. | |
| 6,343,006 B1 | 1/2002 | Moscovitch et al. | |
| 6,499,704 B2 | 12/2002 | Oddsen, Jr. | |
| 6,505,988 B1 | 1/2003 | Oddsen, Jr. | |
| 6,554,235 B1 | 4/2003 | Fortier | |
| 6,554,238 B1 | 4/2003 | Hibberd | |
| 6,679,096 B1 | 1/2004 | Lazik et al. | |
| 6,702,604 B1 | 3/2004 | Moscovitch | |
| 6,739,096 B2 | 5/2004 | Feldpausch et al. | |

(Continued)

FOREIGN PATENT DOCUMENTS

CA 2464818 A1 * 10/2004

(Continued)

OTHER PUBLICATIONS

International Search report for PCTUS2011/039587 dated Nov. 2, 2011.

(Continued)

*Primary Examiner* — Teri P. Luu
*Assistant Examiner* — Erin W Smith
(74) *Attorney, Agent, or Firm* — Buchanan Ingersoll & Rooney P.C.

(57) ABSTRACT

A support apparatus includes a first substantially horizontal member positioned adjacent to first and second elongated substantially vertical member members. The first substantially horizontal member has a channel formed in its rear side. The channel is sized and configured to receive wiring for display devices. The first substantially horizontal member is supported or attached to first and second collars positioned on the first and second elongated substantially vertical members such that movement of the first and second collars adjusts a vertical position of the first substantially horizontal member. One or more display devices, such as LCD screens or computer monitors, may be positioned on the first substantially horizontal member. Preferably, each display device positioned on the first substantially horizontal member is connected to the first substantially horizontal member via a connector that utilizes a releasable attachment mechanism that permits an easy removal or connection to the first substantially horizontal member.

24 Claims, 11 Drawing Sheets

U.S. PATENT DOCUMENTS

| | | |
|---|---|---|
| 6,863,252 B2 | 3/2005 | Bosson |
| 6,905,101 B1 | 6/2005 | Dittmer |
| D518,063 S | 3/2006 | Piazza et al. |
| 7,014,157 B2 | 3/2006 | Oddsen |
| 7,036,451 B1 * | 5/2006 | Hutchinson .................. 114/364 |
| 7,048,242 B2 | 5/2006 | Oddsen, Jr. |
| D537,323 S | 2/2007 | Saez |
| 7,182,301 B1 | 2/2007 | Oddsen, Jr. et al. |
| 7,246,780 B2 | 7/2007 | Oddsen, Jr. |
| 7,252,277 B2 | 8/2007 | Sweere et al. |
| 7,369,401 B1 | 5/2008 | Floersch et al. |
| 7,389,965 B2 | 6/2008 | Oddsen, Jr. et al. |
| 7,392,969 B2 | 7/2008 | Chiu et al. |
| 7,652,876 B2 | 1/2010 | Moscovitch |
| 2005/0028499 A1 | 2/2005 | Greif et al. |
| 2005/0133678 A1 | 6/2005 | Dittmer |
| 2005/0284997 A1 | 12/2005 | Tisbo et al. |
| 2006/0266909 A1 | 11/2006 | Oddsen, Jr. et al. |
| 2008/0237439 A1 | 10/2008 | Oddsen |
| 2009/0173847 A1 * | 7/2009 | Dittmer et al. ............. 248/125.2 |
| 2010/0044541 A1 * | 2/2010 | Sapper et al. ................. 248/371 |

FOREIGN PATENT DOCUMENTS

| | | |
|---|---|---|
| DE | 20318230 U1 | 3/2004 |
| GB | 2 440 606 | 2/2008 |
| GB | 2452083 A | 2/2009 |
| JP | 8312885 A | 11/1996 |
| WO | 2007118862 | 10/2007 |
| WO | 2007137905 | 12/2007 |
| WO | 2008012368 | 1/2008 |
| WO | 2008022873 | 2/2008 |
| WO | 2008091998 | 7/2008 |
| WO | 2008113860 | 9/2008 |
| WO | WO 2009089169 A1 * | 7/2009 |
| WO | 2009151760 | 12/2009 |

OTHER PUBLICATIONS

Written Opinion of the International Searching Authority for PCTUS2011/039587 dated Nov. 2, 2011.

Sitbetter Website Materials; http://www.sitbetter.com/blog/tag/monitor-arm/page/2.

Humanscale M8 Monitor Arm Materials; http://www.humanscale.com/about/news.cfm?newsid=172.

Knoll Website Materials; http://www.knoll.com/news/hstory.jsp?story_id=5508&type=press%20Releases&storyType=nf.

iTech News Net Web Page Materials; http://www.itechnews.net/2009/06/15/steelcase-eyesite-monitor-arm.

* cited by examiner

SUPPORT APPARATUS

CROSS REFERENCE TO RELATED APPLICATION

The present application claims priority to U.S. Provisional Patent Application Ser. No. 61/353,714, which was filed on Jun. 11, 2010. The entirety of U.S. Provisional Patent Application Ser. No. 61/353,714 is incorporated by reference herein.

FIELD OF THE INVENTION

The present invention relates to devices sized and configured to support objects such as monitors, computer components, and wiring.

BACKGROUND OF THE INVENTION

Support arms such as monitor supports or copy holders often include one or more arms that extend from a support post. The arm is configured to hold an object, such as a monitor. The support post is typically clamped to a support surface, such as a desk, table or partition wall. Examples of support arms and similar support apparatuses are disclosed in U.S. Pat. Nos. 7,652,876, 7,392,969, 7,389,965, 7,369,401, 7,252,277, 7,246,780, 7,182,301, 7,048,242, 7,014,157, 6,905,101, 6,863,252, 6,739,096, 6,702,604, 6,679,096, 6,554,238, 6,554,235, 6,505,988, 6,499,704, 6,343,006, 5,992,809, 5,772,174, 5,687,939, 5,553,820, D518,063, and D537,323, U.S. Patent Application Publication Nos. 2010/0044541, 2005/0284997, 2005/0133678, 2005/0284991, 2006/0266909, and 2008/0237439, World Intellectual Property Publication Nos. WO 2009/151760, WO 2008/091998, WO 2008/113860, WO 2008/012368, WO 2008/022873, WO 2007/137905 and WO 2007/118862 and United Kingdom Patent Application No. GB 2,440,606.

When using a support arm, a user typically rotates the support arm about a support post to position the support arm at a desired location for viewing or using a computer screen or other object held by the support arm. Adjusting the vertical position of a support arm can be difficult. For instance, support arms are typically configured such that vertical adjustment of the support arm is time consuming or unable to provide fine adjustment.

For example, World Intellectual Property Publication No., WO 2008/022873 discloses a support arm that includes a support post with circumferential recesses at certain spacing intervals and a collar configured to attachment to the post at any of these recesses. A support configured for holding an object such as a monitor may be attached to the collar and supported on the post by the collar. A user may not easily reposition the collar vertically from one circumferential recess to a second circumferential recess along the collar. Due to the weight of the objects supported by the collar, a user may have to remove the support and monitor or other object attached to the collar prior to vertically moving the collar and support arm to a new location at a different recess. Removal of such objects may not be easily done since the objects can include televisions, computer monitors or other equipment that is wired or interconnected to other devices. Indeed, the adjustment of the collar and support aim to a different recess can require a specialist to provide such adjustment to ensure the object being held by the support arm is not damaged during the adjustment of the collar to a new recess.

Various support arms require springs, such as gas springs or coiled springs, to help support an object at a particular location and permit positioning adjustment of the support arm. For instance, World Intellectual Property Publication No. WO 2007/118862 discloses a support arm that requires a gas spring and a cable to support an object held by the arm in a particular position. The support arm also has a sleeve that may be slid over a cylindrical support post for attachment to the support post. The use of cables often detracts from the aesthetic effect of the support arm. The use of exposed springs or gas springs can also detract from the aesthetic effect of a support arm. Moreover, the use of springs and cables to support an object often increase the cost of fabricating such support apparatuses.

A support apparatus is needed that can permit a user to easily adjust the vertical position of multiple objects held by the support apparatus. Preferably, the support apparatus has a wide range of design options that are not limited by a requirement for springs or cables to help support an object.

SUMMARY OF THE INVENTION

A support apparatus may include a first elongated substantially vertical member having one or more threads and a second elongated substantially vertical member having one or more threads. A first collar is moveably attached to the first elongated vertical member and a second collar is moveably attached to the second elongated vertical member. Each collar is rotatable such that the collar moves along the at least one thread of the substantially vertical member to which it is attached in a generally upwards direction when rotated in one direction and in a generally downwards direction when rotated in the opposite direction. A first substantially horizontal member is positioned adjacent to the first and second substantially vertical members. A rear side of the first substantially horizontal member has a channel formed in its rear side that is sized and configured to retain wiring, such as cables or wires. The first substantially horizontal member is supported or attached to the first and second collars so that movement of the first and second collars adjusts a vertical position of the substantially horizontal member.

The one or more threads may be, for example, one or more grooves formed in the substantially vertical member or one or more beads formed on the substantially vertical member. Preferably, the one or more threads extend to define a spiral path for one or more collars.

The substantially vertical members may each be a member such as a rod, bar, or rail that is arranged so that the length of the members extend in a mostly vertical direction, such as a member that is arranged to extend normal to a floor or work surface, or a member that extends at an angle of 80 degrees or 75 degrees relative to a horizontal surface, such as a table top or floor. The substantially horizontal members may be members that are arranged so that the length of the member extends in a mostly horizontal direction, such as rails, bars, curved rails, curved bars, or rods that have a length that extends in a direction that is parallel to a floor or work surface or has a length that extends in a direction that has between 0 and 1 degree of inclination or declination.

Preferably, embodiments of the support apparatus are configured to support objects such as display devices. Examples of display devices are monitors, liquid crystal displays (LCDs), and computer screens. For instance, the support apparatus may include one or more quick release attachment mechanisms to attach one or more display devices to the first substantially horizontal support member. Preferably, each quick release attachment mechanism has a substantially horizontal member mounting portion that has an upper portion configured to engage an upper portion of the first substantially horizontal member and a moveable member that is moveable from a first position to a second position and is biased to the first position. The moveable member is preferably sized and configured to engage a bottom rear portion of the first substantially horizontal member when in the first position and is configured to permit the quick release attachment mechanism to be removed when in the second position. A user may actuate such movement without using a mechanical tool. Each quick release mechanism is preferably configured so that it may slide along at least a portion of the length of the substantially horizontal member.

Embodiments of the support apparatus may also include additional collars and additional substantially horizontal members. Each horizontal member may be supported on or attached to a set of collars positioned on the first and second substantially vertical members.

In some embodiments, each substantially vertical member may be attached to a respective attachment mechanism, such as a clamp, for attaching the substantially vertical member to a work surface or other structure.

Preferably, embodiments of the support apparatus include sleeves. Each sleeve may be positioned on or attached to a respective collar. The sleeves may be configured to receive a portion of the substantially vertical member so that the sleeve is vertically moveable along that member and also be configured to receive and attach to the substantially horizontal member to attach the substantially horizontal member to the collar or to ensure that the substantially horizontal member is supported on that collar.

A quick release attachment mechanism sized and configured to attach a display device to a support arm or elongated member of a display device holding device is also provided. The quick release attachment mechanism includes a display device mounting portion comprising a mounting plate having an outer peripheral portion that is rotatable about an inner portion. The mechanism also includes a member attachment portion sized and configured to attach to a support arm or elongated member of a display device holding device. A vertical adjustment mechanism is also included. The vertical adjustment mechanism has a connector that is moveable within a slot of the member attachment portion. The connector has a first side and a second side opposite the first side. The first side of the connector is attached to the display device mounting portion and the second side of the connector is positioned through the slot and is moveably attached to the member attachment portion.

Embodiments of the quick release attachment mechanism may include a pin that passes through a hole in the connector and an opening in the display device mounting portion to moveably attach the connector to the display device mounting portion.

In some embodiments, the connector may be moveable within the slot to a plurality of different positions defined by one of teeth, projections, structure adjacent to the slot, and steps defined by or attached to the member attachment portion. The teeth, projections, structure adjacent to the slot, or steps may be attached to the member attachment portion.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of a support apparatus are shown in the accompanying drawings and certain present preferred methods of practicing the same are also illustrated therein.

DETAILED DESCRIPTION OF PRESENT PREFERRED EMBODIMENTS

Figure 1:
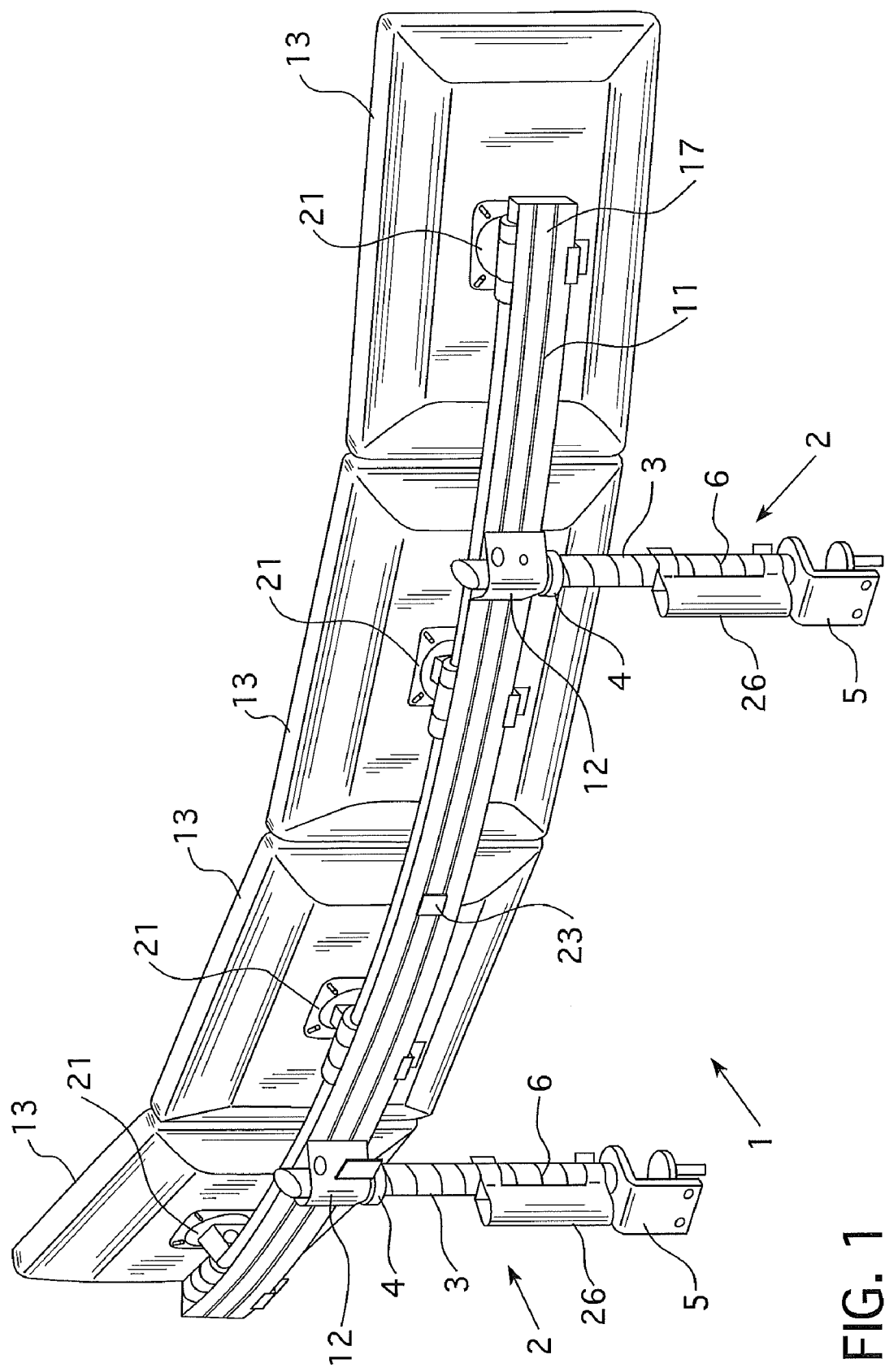
FIG. 1 is a rear perspective view of a first present preferred embodiment of a support apparatus.
Figure 2:
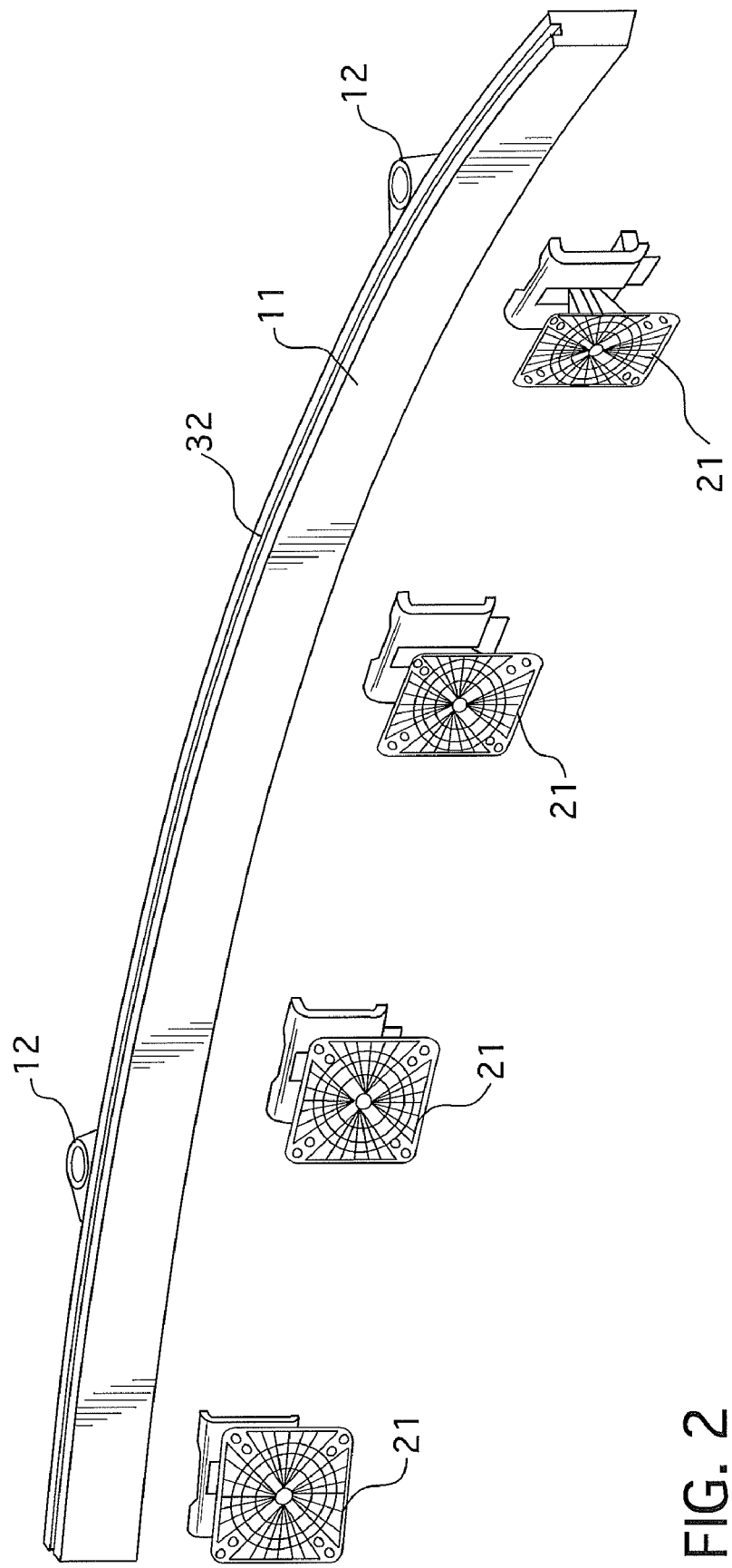
FIG. 2 is an exploded view of a present preferred support member and present preferred quick attachment mechanism that may be utilized in embodiments of the support apparatus.
Figure 3:
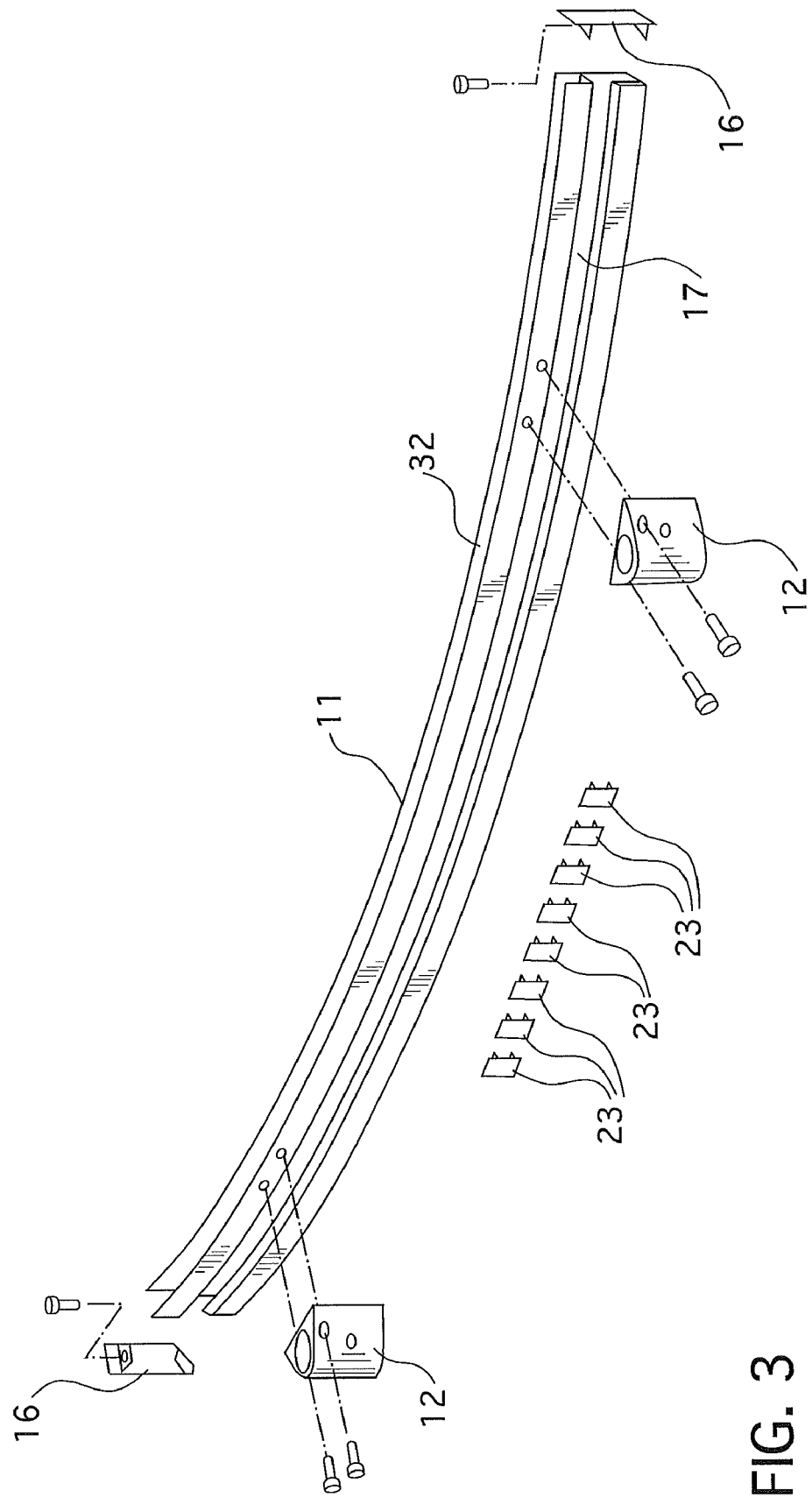
FIG. 3 is a rear exploded view of a present preferred support member that may be utilized in embodiments of the support apparatus.
Figure 4:
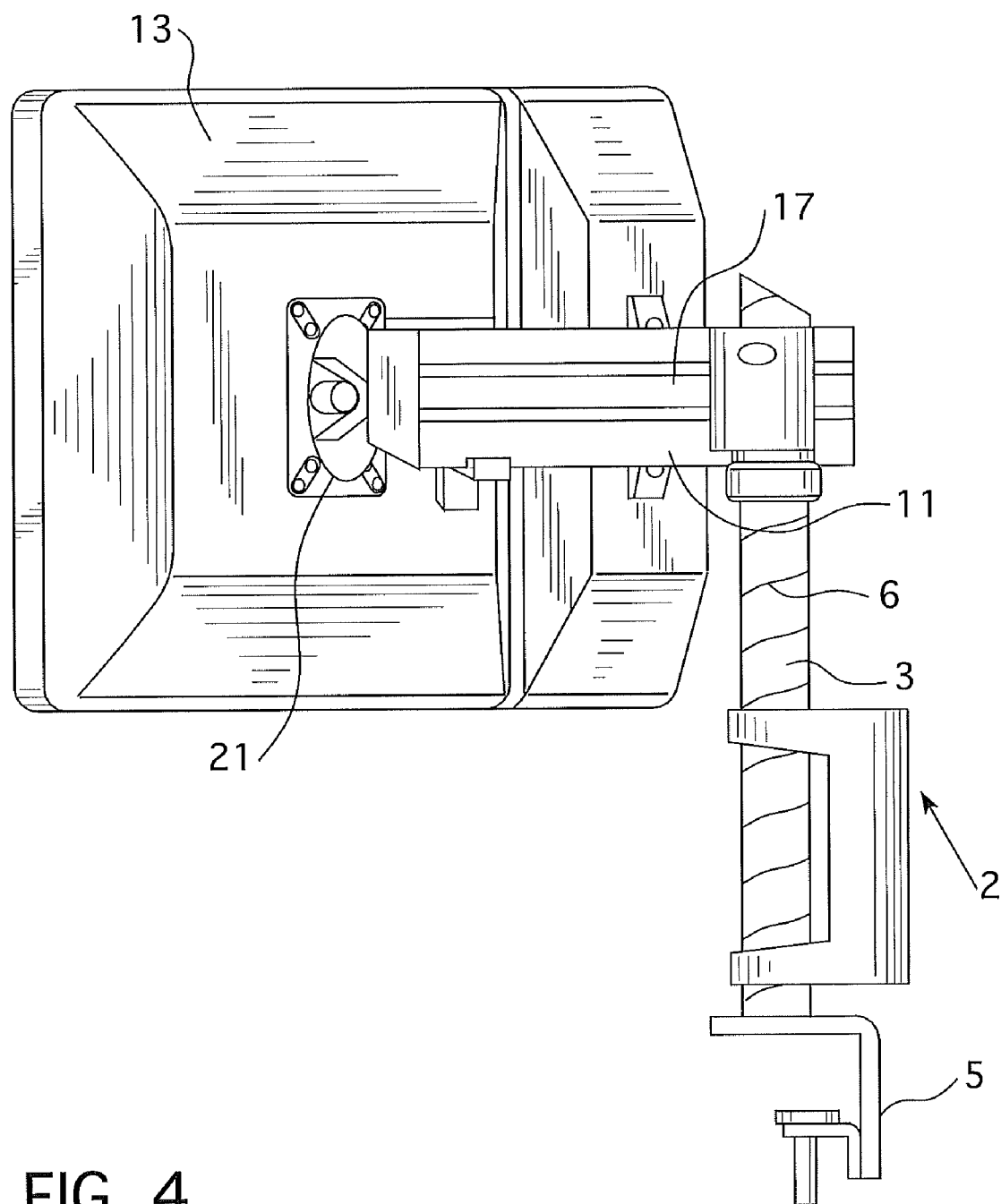
FIG. 4 is a side view of the first present preferred embodiment of the support apparatus.

Referring to FIGS. 1-5, a support apparatus 1 may include a plurality of elongated vertical member mechanisms 2. Each vertical support mechanism 2 may include an attachment device 5 for attaching a vertical member 3 to a surface, such as a work surface. The attachment device 5 may be a clamp or other attachment mechanism. Each vertical member 3 may be perfectly vertical such that the length of the vertical member 3 extends along its length in an upwards direction perpendicular to a horizontal direction or may be substantially vertical. A substantially vertical member 3 may extend along its length in an upward direction that is perpendicular to the ground or a perfectly horizontal surface or may be about perpendicular, such as extending in a direction that is 85 degrees, 88 degrees or 89 degrees relative to a perfectly horizontal surface or a work surface.

Each vertical member 3 is preferably a rod, or elongated cylindrical member that has at least one thread 6 formed thereon or formed therein. Each vertical member 3 may alternatively be a generally polygonal shaped member or may be a rail or elongated support structure. The thread 6 may be one or more grooves that spiral along the outer surface of the vertical member 3 or one or more beads that spiral along the outer surface of the vertical member 3.

A collar 4 may be moveably attached to the vertical member 3. Each collar may be similar to the collars disclosed in U.S. patent application Ser. No. 12/372,110, filed on Feb. 17, 2009. The entirety of U.S. patent application Ser. No. 12/372,110 is incorporated herein by reference.

The movement of the collar 4 may be defined by the thread 6. For instance, each collar may include a tooth or projection that projects inwardly. The tooth or projection may be sized and configured to fit within the thread 6. The collar 4 may be configured so that rotation of the collar in a first direction may make the collar move upwards along the vertical member 3 and rotation of the collar in a second direction opposite the first direction may cause the collar to move downwards along the vertical member 3. For instance, the first direction may be a clockwise direction and the second direction may be a counter clockwise direction. The collar may be moveable to any position along the thread 6.

The collar 4 may also include a set screw that is positioned therein. The set screw may be positioned so that it is moveable from a first position in which it engages a portion of the vertical member 3 to help lock a particular position of the collar to a second position. When in the second position, the set screw may be positioned so that it does not engage the vertical member 3 and permits movement of the collar along the thread 6.

A horizontal support member 11 may be positioned adjacent to the vertical support members 3. The horizontal support member 11 is preferably curved or arcuate in shape. It should be understood that the horizontal support member 11 is horizontal because it extends in a substantially horizontal direction along its length. For example, the horizontal member may extend along its length at a 0 degree inclination, extend along its length at between a 0 degree inclination and a 1 degree inclination, or extend along its length at between a 0 degree declination and a 1 degree declination.

The horizontal support member 11 may include brackets or sleeves 12. The sleeves may include a tubular or pipe-like member that is attached to the horizontal member 11 by fasteners such as screws, bolts or an adhesive or is an integral portion of the horizontal member 11. The sleeves 12 may include an opening or channel sized and configured to receive a vertical support member such that the sleeves can be slid along the vertical support members 6. The sleeves 12 may also be sized and configured to rest or be supported on the collars 4. Collars 4 may be rotated to adjust the vertical position of the horizontal member 11 while the sleeves are supported on the collars 4 or positioned on the collars 4.

It is also contemplated that the sleeves 12 may include one or more set screws for engaging a portion of the vertical members 3 to prevent rotation or movement of the sleeves when the collars are rotated. Each set screw may be moveable from an engaging position that positioned a portion of the set screw to engage the vertical member 3 to a non-engaging position that positions the set screw so it does not engage the vertical member 3. In alternative embodiments, the vertical support members 3 may have a relatively smooth exterior surface without any thread or groove and each sleeves 12 may include one or more set screws that are positionable for directly securing the horizontal support members 11 to the vertical support members 3 when the sleeves are positioned for the vertical members 3 for attaching the horizontal member 11 to the vertical members 3. It should be appreciated that such alternative embodiments of the support apparatus may not utilize any collars 4.

The horizontal member 11 may include a channel 17 or groove formed on a rear side of the horizontal member. The channel 17 may be arcuate or define a curved opening in the horizontal member 11 if the horizontal member is curved or arcuate in shape.

Preferably, the channel is sized and configured to receive cables or wiring (not shown) that may be used for attaching to electrical devices such as monitors 13, LCD screens, or display devices. Quick release attachment mechanisms 21 may be attached to the horizontal member 11 to attach display devices or monitors 13 to the horizontal member 11.

Cord covers or cord retaining members 23 may also be attached to the horizontal member 11. Preferably, the cord covers are positioned over or adjacent to the channel 17 to cover or help retain portions of wiring (not shown) used to provide power or data to the display devices or electrical devices attached to the horizontal member via the quick release attachment mechanisms 21.

End caps 16 may also be attached to the horizontal member 11 at the ends of the horizontal member. The end caps may provide ends to the channel 17 for blocking or covering the ends of the channel 17.

The horizontal member 11 may be perfectly horizontal or may be substantially horizontal. For instance, the horizontal member 11 may be perfectly horizontal such that the horizontal member extends in a direction having a 0 degree grade of inclination and is generally level. A substantially horizontal member 11 may also be a horizontal member 11 that is oriented in a position such that the horizontal member 11 extends in a direction that has 1 degree of inclination, 0.5 degrees of inclination, 0.5 degrees of declination or 1.0 degrees of declination along its length.

Heavy duty cord managers, such as heavy duty cord managers 26 may be attached to the substantially vertical members 3 to also facilitate cord management. Such cord manager devices may be attached to the substantially vertical member 3 to help collect and guide cords downward from the monitors to below a work surface to an outlet or other power supply distribution mechanism in an organized and aesthetically desirable manner. The heavy duty cord managers 26 may each have a body that defines a channel or passageway sized and configured to receive and retain the cords for this purpose such that the cords run along the rear side of the support apparatus 1 and are generally hidden from view or at least mostly blocked from a user's view.

Figure 5:
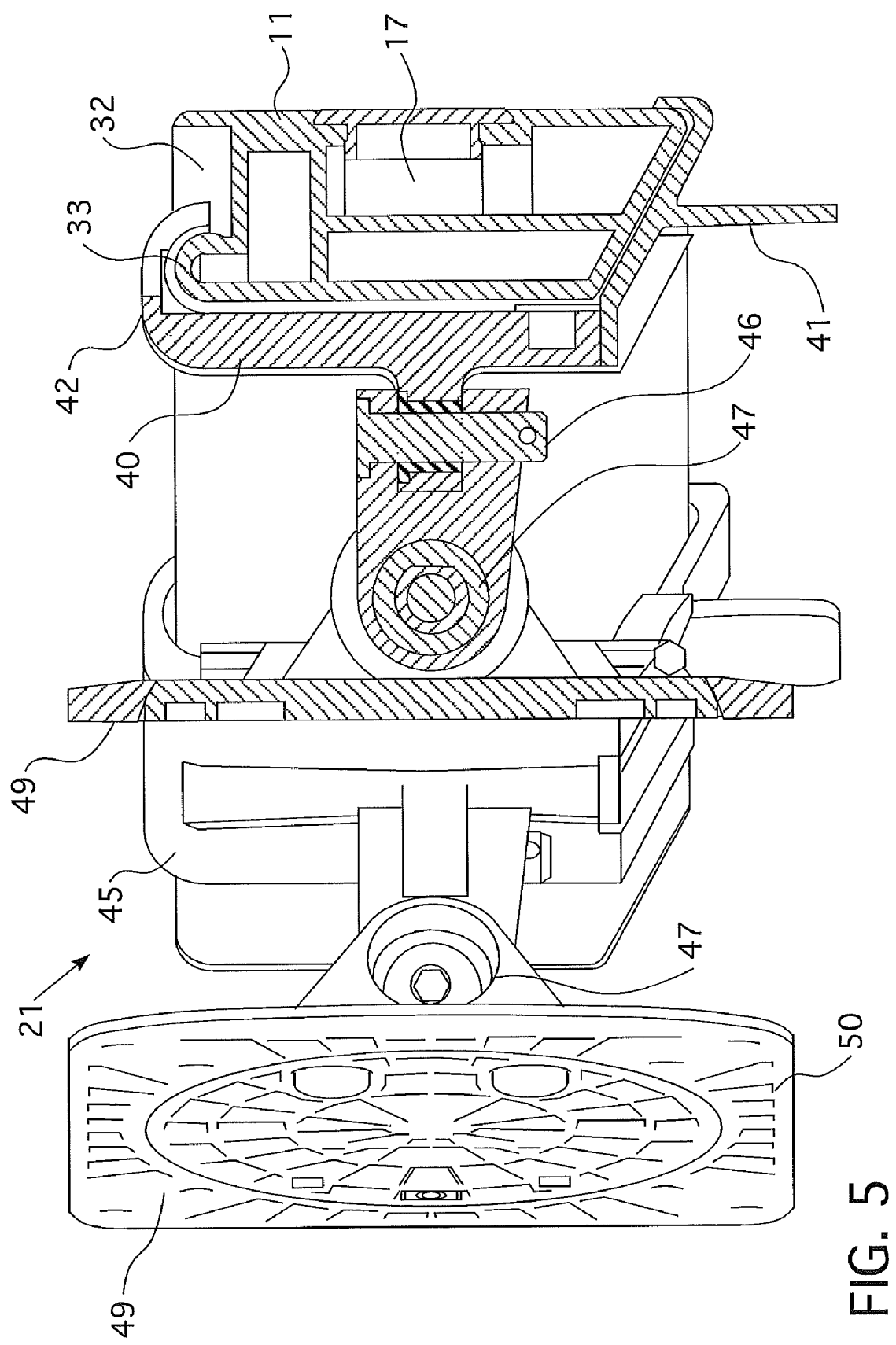
FIG. 5 is a cross sectional view of the first present preferred embodiment of the support apparatus illustrating a present preferred quick release attachment mechanism attached to a present preferred support member.
Figure 5A:
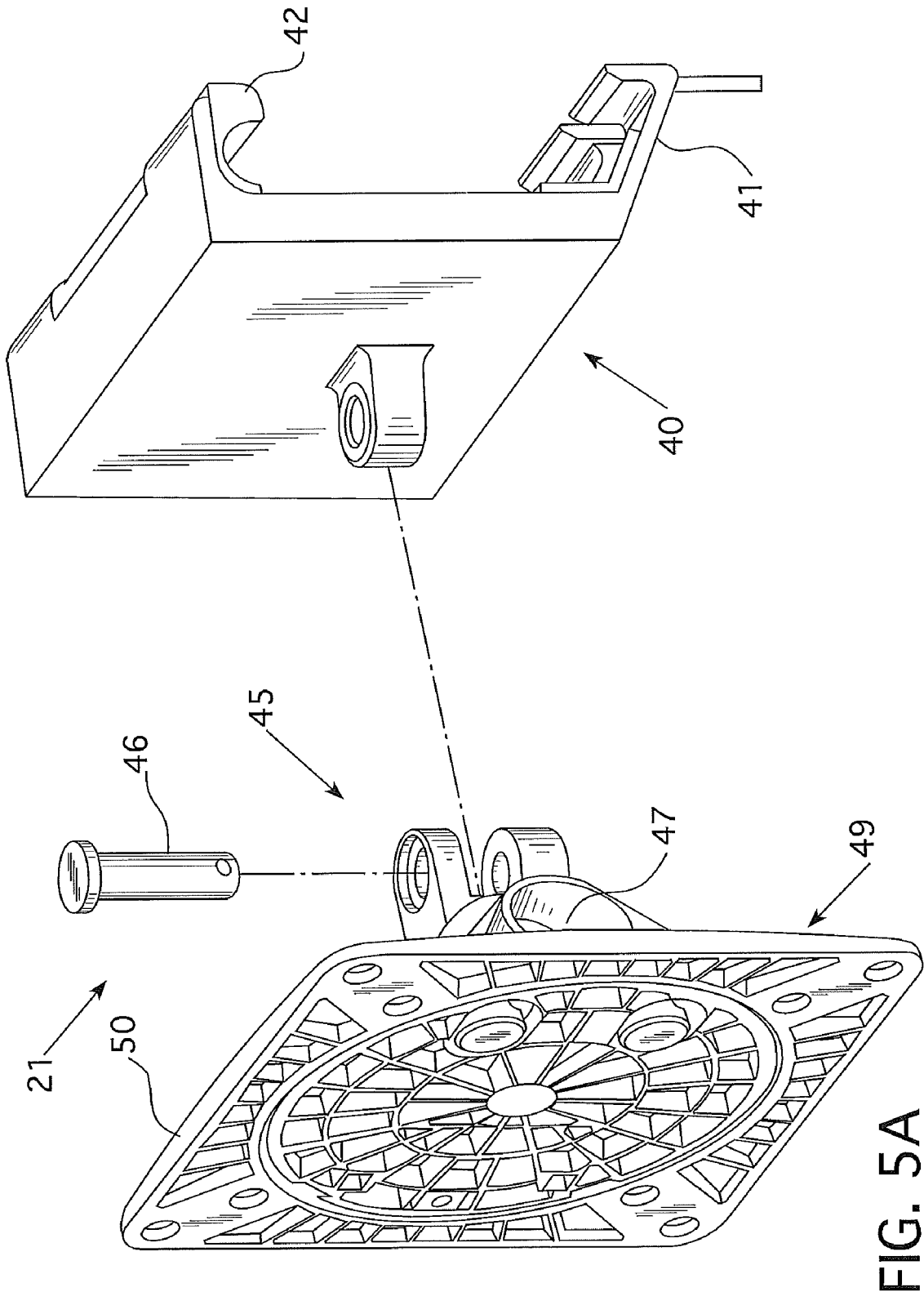
FIG. 5A is an exploded view of a first present preferred quick release attachment mechanism that may be used in embodiments of the support apparatus.
Figure 5B:
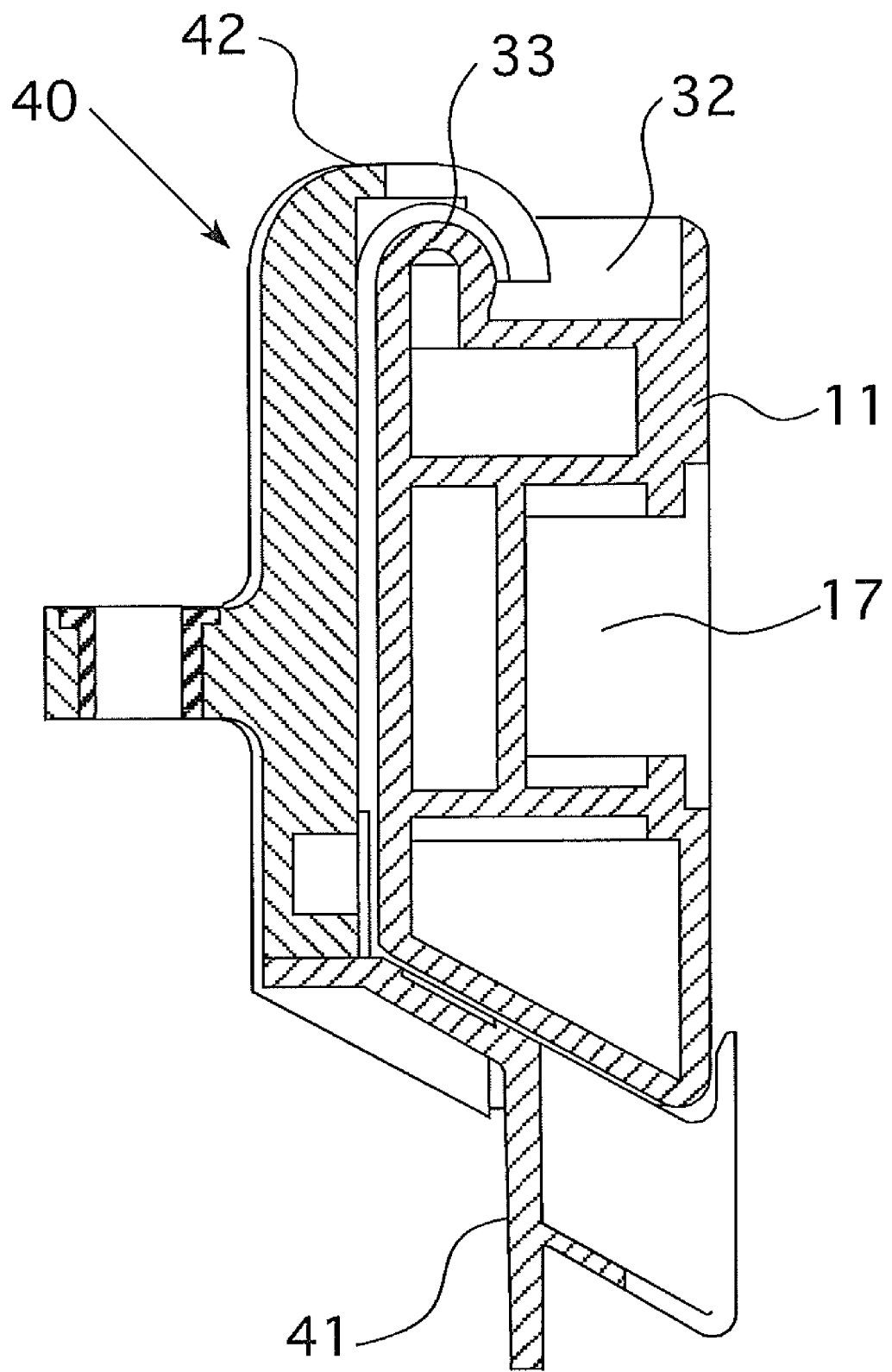
FIG. 5B is a side view of a present preferred horizontal member mounting portion of the first present preferred quick release attachment mechanism attached to a portion of a horizontal member.

Referring to FIGS. 5, 5A and 5B, the horizontal member 11 may also include an upper channel or upper groove 32 formed therein. The horizontal member may also include a rounded front wall that defines a front wall of the upper groove 32. The upper groove 32 may be spaced apart from the channel 17 via a portion of the horizontal member 11.

Each quick release attachment mechanism 21 is sized and configured to permit releasable and slideable attachment to the horizontal member 11. The quick release attachment mechanisms 21 are "quick release" because they do not require the use of a mechanical tool such as a screw driver or crow bar to release, or separate, the horizontal member 11 from a display device or monitor 13 attached to the quick release attachment mechanism 21.

Each quick release attachment mechanism 21 may include a horizontal member mounting portion 40 that includes an upper portion 42 that is sized and configured to be positioned on the rounded upper front wall 33 and have a portion at least partially extend into the upper groove 32. A moveable member 41 may be attached to the horizontal member mounting portion 40 such that the moveable member is moveable from a first position to a second position. Preferably, the moveable member 41 is attached to the horizontal member mounting portion 40 such that the moveable member 41 is biased to the first position. An end of the moveable member 41 may include or be attached to a catch or retaining device configured to engage or grip a bottom portion of the horizontal support member 11.

The mounting member portion 40 and upper portion 42 may be integrally attached together and composed of metal such as steel, aluminum or zinc or a polymeric material such as a nylon material. The moveable member 41 may be composed of a polymeric material such as a nylon material. Alternatively, the moveable member 41 may be composed of metal, such as spring steel or may be composed of some combination of metal and a polymeric material or other materials.

The moveable member 41 may be attached to the mounting member portion 40 via fasteners. It is contemplated that the moveable member may alternatively be attached to the mounting member portion 40 by other fastening mechanisms. The upper portion 42 may be covered, lined or encased by a low friction material such as acetal to permit the upper portion 42 to be easily slid within the upper groove 32 such that the sliding movement does not mar or make an undesirable screeching sound when slid along the upper front wall 33. The covering, liner or encasement may be composed of a polymeric material.

When the moveable member 41 is in the first position, the moveable member is positioned to grip a bottom portion of the rear side of the horizontal member 11. Preferably, the bottom portion of the rear side of the horizontal member 11 is a flat surface. The moveable member 41 may be moved to a second position to permit the quick release mechanism to be removed from a horizontal member 11 to which it is attached. A user may pull on a projection extending from the moveable member 41 to move the moveable member to the second position.

The moveable member may be sized and configured to provide a biasing force or may be attached to a biasing mechanism such as a resilient member or biasing mechanism to cause the moveable member to be biased to the first position. If a user does not apply a force to pull or move the moveable member 41, that biasing mechanism may move the moveable member 41 to the first position and maintain the moveable member 41 in that first position. Such biasing helps ensure that the quick release mechanism stays attached to a horizontal member 11 unless a user wants to r remove that mechanism 21 from the horizontal member 11.

The quick release attachment mechanism 21 may also include a monitor mounting portion 45. The monitor mounting portion 45 is attached to the horizontal member mounting portion 40 via a rotatable attachment 46, which may be defined by a pivot pin or other axle member. The rotatable attachment may be configured to permit vertical or horizontal rotation of the monitor mounting portion relative to the horizontal member mounting portion 40. In some embodiments, it is contemplated that the rotatable attachment may include a ball and socket type joint to permit the monitor mounting portion 45 to move both vertically and horizontally relative to the horizontal member mounting portion 40.

A monitor mounting plate 49 may be attached to the monitor mounting portion 45. A rotational attachment may be made between the monitor mounting plate 49 and the monitor mounting portion 45 via a horizontal or vertical axle, such as pivot pin 46. In alternative embodiments, it is contemplated that a ball and socket type joint could connect the monitor mounting plate to the monitor mounting portion to permit vertical and horizontal movement of the mounting plate 49 relative to the monitor mounting portion 45. Preferably, the mounting plate 49 is a VESA compliant monitor mount and includes a rotational component 50 that rotates about a center of the mounting plate 49 to permit a monitor attached to the mounting plate 49 to be rotated in a circular direction when attached to the plate in addition to be tiltable in horizontal and vertical directions via pivot pins 46 and 47 or a ball and socket joint connection as mentioned above.

As may be appreciated from FIG. 1, the horizontal support 11 may be sized and configured to support multiple display devices, such as four display devices. The number of display devices that may be supported by the horizontal member is at least partially dependent upon the size and shape of the display devices and the size, shape, and length of the horizontal member.

Preferably, the horizontal member is generally rectangular in shape and is composed of metal such as aluminum, steel or zinc. The horizontal member 11 preferably includes the wire management channel 17 and the upper groove 32. Of course, it is contemplated that other shapes or structures for the horizontal member 11 could be made. For instance, the horizontal member 11 could be a rail that is generally straight in shape or may be a curved or arcuate rail. As another example, the horizontal member 11 may be a shaft or rod.

The display devices, such as monitors 13, may be moved along the horizontal member 11 by sliding the quick release attachment mechanisms 21 along the length of the horizontal rail. Such sliding may occur such that the upper portions 42 of the quick release attachment mechanisms 21 engage the upper front wall 33 of the horizontal member 11 for at least a portion of the sliding movement. The moveable member 41 may also be in engagement with a rear bottom portion of the horizontal member below the channel 17 during the sliding movement. Such sliding movement may adjust a horizontal position of a monitor or display device.

A user may also adjust a tilt or angular position of the monitor by moving the monitor 13 or other display device via the axles 46 and 47 of the quick release mounting mechanisms 21. The mounting plate 49 may also be configured to permit a rotation of a monitor or display device attached to the mounting plate via axle 50. A monitor 13 or display device may be rotatable so it may be rotated along a circular path.

In alternative embodiments, it is contemplated that the sleeves 12 may be replaced with arms or moveable arms for attaching the horizontal member 11 to the different vertical members 3. The moveable arms may include a plurality of interconnected linkages or portions or may be just one unitary arm member.

Figure 6:
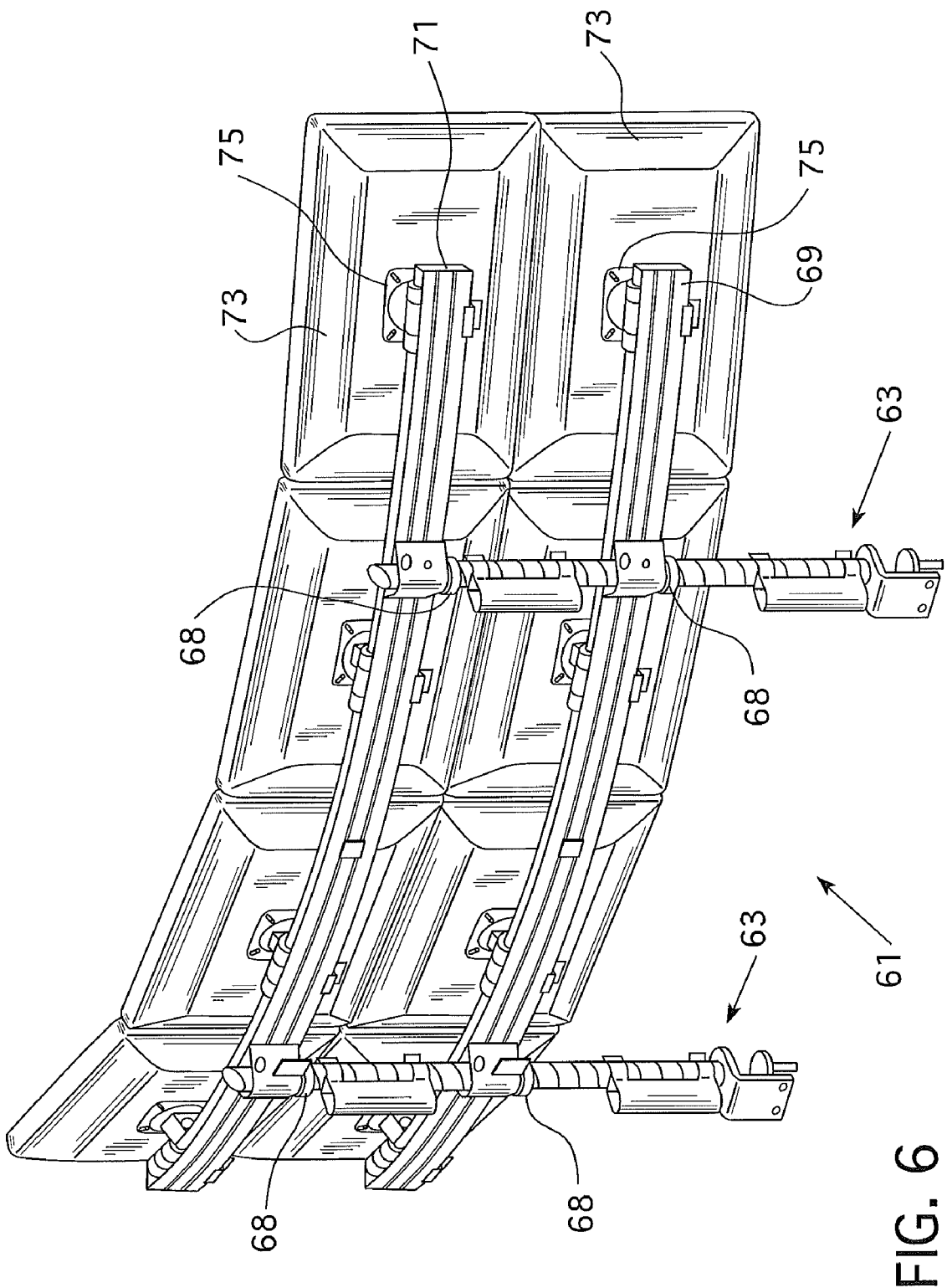
FIG. 6 is a rear perspective view of a second present preferred embodiment of a support apparatus.

Referring to FIG. 6, it is also contemplated that embodiments of the support apparatus may include multiple horizontal members supports on vertical support members via collars 68 so that the heights of the monitors may be vertically adjusted via the collars while the horizontal and rotational positioning of the monitors may also be adjusted via the quick release attachment mechanisms. For instance, a support apparatus 61 may include vertical support members 63 that have collars positioned therein. The collars 68 may be similar to collars 4 discussed above. Quick release mechanisms 75 may be releasably and slidably attached to respective horizontal members 69 and 71 to interconnect display devices 73 with the horizontal members 69 and 71. The horizontal members 69 and 71 may be similar in structure to the horizontal member 11 discussed above. The quick release attachment mechanisms 75 may be similar to the quick release attachment mechanisms 21 discussed above.

Figure 7:
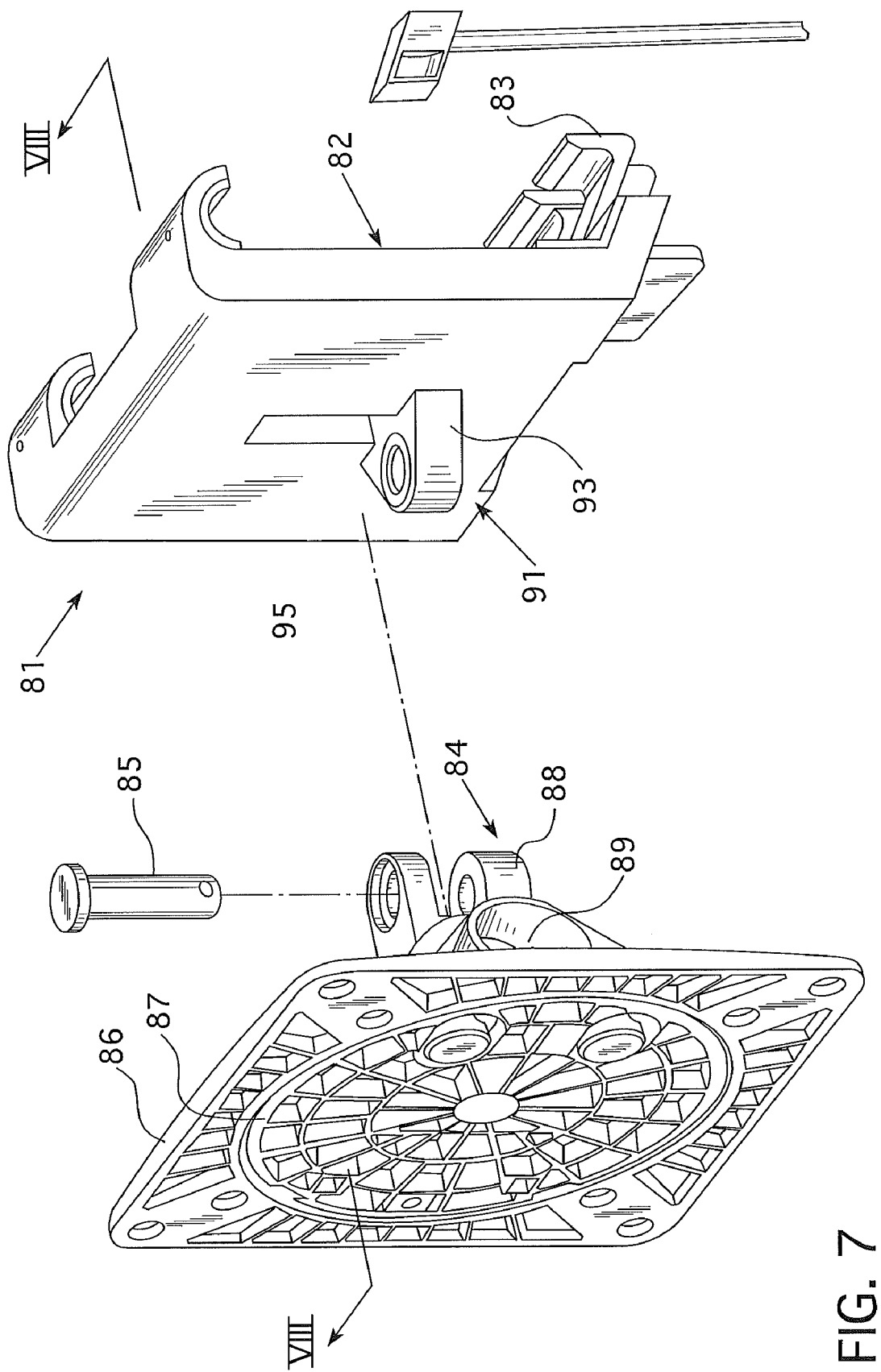
FIG. 7 is an exploded view of a second present preferred quick release attachment mechanism that may be used in embodiments of the support apparatus.
Figure 8:
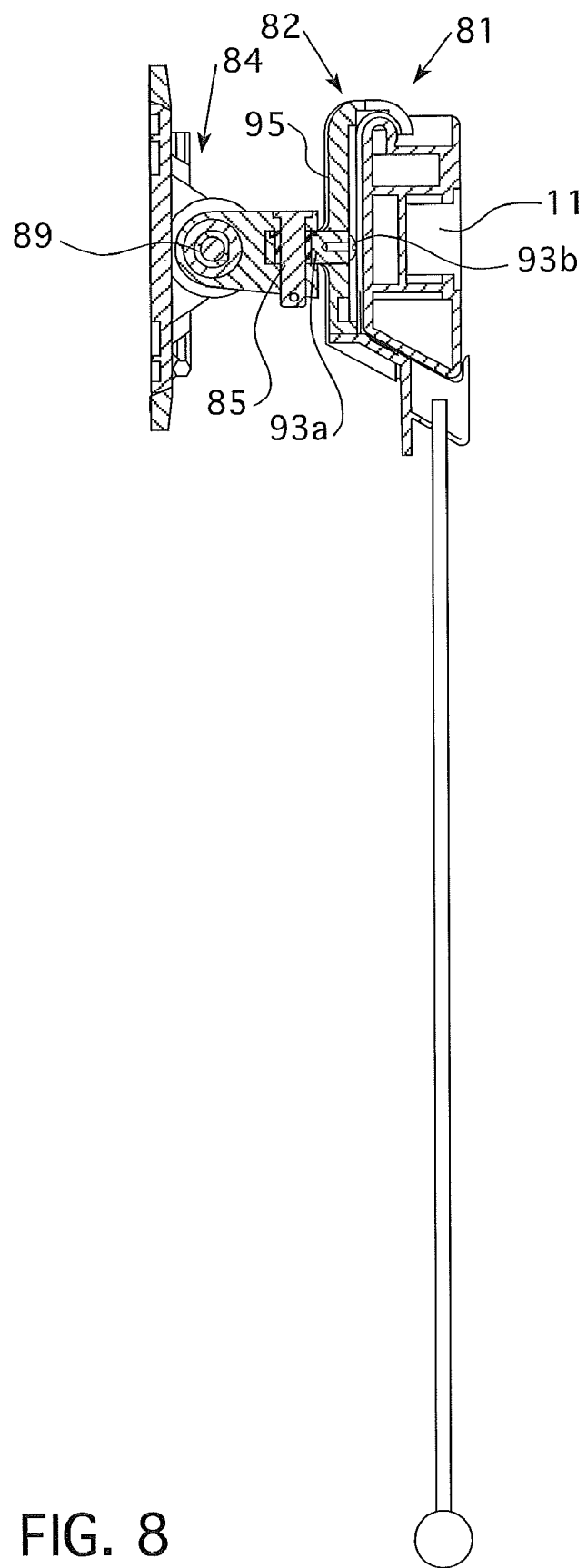
FIG. 8 is a cross sectional view of the second present preferred quick release attachment mechanism taken along line VII-VII in FIG. 7.
Figure 9:
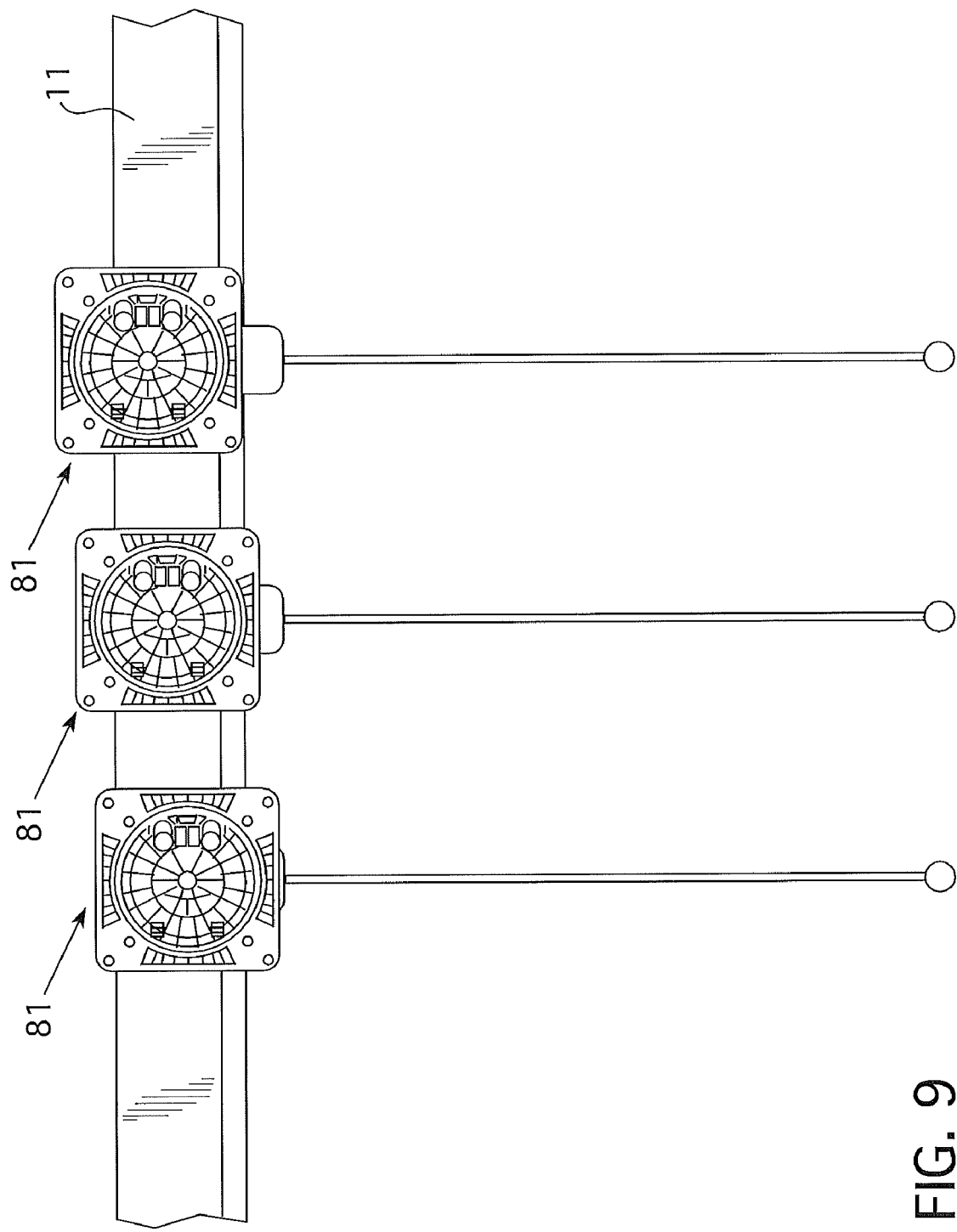
FIG. 9 is a fragmentary front view of a third present preferred embodiment of a support apparatus, which utilizes embodiments of the second present preferred quick release attachment mechanism. It should be appreciated that FIG. 9 illustrates different mounting plates of different quick release attachment mechanisms being at different selected height positions.

Alternatively, a quick release attachment mechanism 81 may be used in embodiments of the support apparatus, as may be appreciated from FIGS. 7-9. The quick release attachment mechanism 81 may include a horizontal member mounting portion 82 that includes an upper portion that is sized and configured to be positioned on the rounded upper front wall 33 and have a portion at least partially extend into the upper groove 32. A moveable member 83 may be attached to the horizontal member mounting portion 82 such that the moveable member is moveable from a first position to a second position. Preferably, the moveable member 83 is attached to the horizontal member mounting portion 82 such that the moveable member 83 is biased to a first position. An end of the moveable member 83 may include or be attached to a catch or retaining device configured to engage or grip a bottom portion of the horizontal support member 11 when in the first position, but be moved to a second position that spaces that moveable member 83 from the horizontal support member 11 so that the quick release attachment mechanism 81 may be separated from the horizontal support member 11 for removing or replacing an object, such as a monitor, attached the a mounting plate portion of the quick release attachment mechanism 81.

The horizontal member mounting portion 82 is attached to a monitor mounting portion 84 via a moveable attachment mechanism. For instance, a pivot pin 85 may be inserted through a hole formed in a rear portion 88 of the monitor mounting portion 84 and also pass through a hole formed in a portion of the horizontal member mounting portion 82 to moveably connect the two portions together.

The monitor mounting portion 84 may also include a pivot pin 89 that is attached to a mounting plate. The pivot pin permits the mounting plate to be moveable about a substantially horizontal axis defined by the pivot pin 89 so that a monitor attached to the mounting plate may be tilted upwards or downwards. The mounting plate includes a peripheral portion 86 that is rotationally connected to a central plate portion 87 such that the peripheral outer portion 86 is rotatable about the central plate portion 87.

Additionally, the quick release attachment mechanism 81 includes a height adjustment mechanism 91. The height adjustment mechanism 91 includes a connector portion 93 that has a hole formed therein. The pivot pin 85 may pass through the hole in the connector 93 to interconnect the mounting plate portion 84 to the horizontal member mounting portion 82. The connector 93 may have a portion that extends through a slot 95 or aperture formed in the body of the horizontal member mounting portion.

The slot 95 may define a path of height adjustment along which the connector portion 91 may move. Preferably, the slot has a length of between two and five inches for defining a slight vertical adjustment of a monitor attached to the mounting plate of the monitor mounting portion 84.

The connector 93 may include a rear portion that passes through the slot 95 and is notched to moveably interlock within detents, projections or protrusions formed adjacent to the slot 95 to define different vertical positions along the slot for the connector 93. For example, as may be appreciated from FIG. 8, the connector 93 may include an outer body 93a and an inner body 93b that is attached to the outer body 93a. The inner body 93b may be attached to the outer body 93a to attach the connector 93 to the horizontal member mounting portion 82. The inner portion 93b may be notches or have a shaped portion configured to matingly interlock with different detents or other structure formed adjacent the slot 95 to define different height positions of the connector 93 along the slot 95. For instance, the connector 93 may move from a lowermost position to one or more middle height positions to an uppermost position. Detents, notches, or other structure may define the positions along the slot at which the connector 93 may be moveably positioned. For instance, the slot may have sidewalls defined with notches to define different vertical positions for the connector 93. Alternatively, detents or steps may be defined adjacent to the slot 95 in an inner or rear portion of the horizontal member mounting portion 82 to engage a portion of the connector that extends through the slot 95. It should be appreciated that the inner portion 93b of the connector is shaped to releasably connect or interlock at these positions so that it is height adjustable by a user.

As another example, the inner portion 93b may define a pawl that is moveable along detents defined by a structure adjacent to the slot. As yet another example, the inner portion 93b may be a pawl or projection that engages with teeth or spaced apart steps adjacent to the slot 95. In yet other embodiments, inner portion 93b may be a screw that is moveable away from the outer portion 93a to unlock the position of the connector 93 so that the connector is moveable along the slot and, after the connector has been positioned at a new height, moved toward the outer portion to engage portions of the horizontal member mounting portion 82 adjacent slot 95 to hold the position of the connector 93.

The vertical height adjustment mechanism 91 may be used so that a height of a monitor or other object attached to the monitor mounting portion 84 of the quick release attachment mechanism may have its height adjusted via vertical movement of the connector 93 within slot 95. Such vertical adjustment does not require movement of the substantially horizontal member 11, any collar, or vertical member 3, which permits a user to more easily adjust a height of one particular monitor that may be connected to a horizontal member 11 via the quick release attachment mechanism 91.

It should be understood that embodiments of the support apparatus has a wide range of design options that are not limited by a requirement for gas springs or cables to help support an object such as one or more monitors or displays. Of course, it is contemplated that certain embodiments may include gas springs or cables to help support an object, such as a monitor.

While certain present preferred embodiments of the support apparatus, and methods of making and using the same have been shown and described above, it is to be distinctly understood that the invention is not limited thereto but may be otherwise variously embodied and practiced as may be appreciated by those of at least ordinary skill in the art. The invention may also be otherwise variously embodied and practiced within the scope of the following claims.

What is claimed is:

1. A support apparatus comprising:
a first elongated substantially vertical member having at least one thread;
a second elongated substantially vertical member having at least one thread;
a first collar moveably attached to the first elongated vertical member, rotation of the first collar in a first direction moves the first collar along the at least one thread of the first elongated substantially vertical member in a generally upwards direction and rotation of the first collar in a second direction that is opposite the first direction moves the first collar along the at least one thread of the first elongated substantially vertical member in a generally downward direction;
a second collar moveably attached to the second elongated vertical member, rotation of the second collar in the first direction moves the second collar along the at least one thread of the second elongated substantially vertical member in a generally upwards direction and rotation of the second collar in the second direction that is opposite the first direction moves the second collar along the at least one thread of the second elongated substantially vertical member in a generally downward direction;

a first substantially horizontal member positioned adjacent to the first and second elongated substantially vertical members, the first substantially horizontal member having a front side and a rear side and having a channel formed in the rear side, the first substantially horizontal member being supported on or attached to the first and second collars such that movement of the first and second collars adjusts a vertical position of the first substantially horizontal member, the channel sized and configured to receive wiring for display devices.

2. The support apparatus of claim 1 further comprising at least one quick release attachment mechanism attached to the first substantially horizontal member, each quick release attachment mechanism sized and configured to connect a display device to the first substantially horizontal member.

3. A support apparatus comprising:

a first elongated substantially vertical member having at least one thread;

a second elongated substantially vertical member having at least one thread;

a first collar moveably attached to the first elongated vertical member, rotation of the first collar in a first direction moves the first collar along the at least one thread of the first elongated substantially vertical member in a generally upwards direction and rotation of the first collar in a second direction that is opposite the first direction moves the first collar along the at least one thread of the first elongated substantially vertical member in a generally downward direction;

a second collar moveably attached to the second elongated vertical member, rotation of the second collar in the first direction moves the second collar along the at least one thread of the second elongated substantially vertical member in a generally upwards direction and rotation of the second collar in the second direction that is opposite the first direction moves the second collar along the at least one thread of the second elongated substantially vertical member in a generally downward direction;

a first substantially horizontal member positioned adjacent to the first and second elongated substantially vertical members, the first substantially horizontal member having a front side and a rear side and having a channel formed in the rear side, the first substantially horizontal member being supported on or attached to the first and second collars such that movement of the first and second collars adjusts a vertical position of the first substantially horizontal member, the channel sized and configured to receive wiring for display devices;

at least one quick release attachment mechanism attached to the first substantially horizontal member, each quick release attachment mechanism sized and configured to connect a display device to the first substantially horizontal member; and wherein each of the at least one quick release attachment mechanisms is comprised of a substantially horizontal member mounting portion that has an upper portion configured to engage an upper portion of the first substantially horizontal member and a moveable member moveable from a first position to a second position, the moveable member being biased to the first position, the moveable member engaging a bottom rear portion of the first substantially horizontal member located below the channel when in the first position and being moved away from the first substantially horizontal member when in the second position to permit the quick release attachment mechanism to be removed from the first substantially horizontal member when the moveable member is in the second position, movement of the moveable member from the first position to the second position being actuated by a user without using a mechanical tool.

4. The support apparatus of claim 1 further comprising a third collar and a fourth collar and a second substantially horizontal member;

the third collar moveably attached to the first elongated substantially vertical member, rotation of the third collar in the first direction moves the third collar along the at least one thread of the first elongated substantially vertical member in a generally upwards direction and rotation of the third collar in a second direction that is opposite the first direction moves the third collar along the at least one thread of the first elongated substantially vertical member in a generally downward direction;

the fourth collar moveably attached to the second elongated substantially vertical member, rotation of the fourth collar in the first direction moves the fourth collar along the at least one thread of the second elongated substantially vertical member in a generally upwards direction and rotation of the fourth collar in the second direction that is opposite the first direction moves the second collar along the at least one thread of the second elongated vertical member in a generally downward direction; and the second substantially horizontal member positioned adjacent to the first and second elongated substantially vertical member, the second substantially horizontal member having a front side and a rear side, the second substantially horizontal member being supported on or attached to the third and fourth collars such that movement of the third and fourth collars adjusts a vertical position of the second substantially horizontal member.

5. The support apparatus of claim 4 further comprising at least one quick release attachment mechanism attached to the first substantially horizontal member and at least one quick release attachment mechanism attached to the second substantially horizontal member, each quick release attachment mechanism sized and configured to connect a display device to the first substantially horizontal member or the second substantially horizontal member.

6. A support apparatus comprising:

a first elongated substantially vertical member having at least one thread;

a second elongated substantially vertical member having at least one thread;

a first collar moveably attached to the first elongated vertical member, rotation of the first collar in a first direction moves the first collar along the at least one thread of the first elongated substantially vertical member in a generally upwards direction and rotation of the first collar in a second direction that is opposite the first direction moves the first collar along the at least one thread of the first elongated substantially vertical member in a generally downward direction;

a second collar moveably attached to the second elongated vertical member, rotation of the second collar in the first direction moves the second collar along the at least one thread of the second elongated substantially vertical member in a generally upwards direction and rotation of the second collar in the second direction that is opposite the first direction moves the second collar along the at least one thread of the second elongated substantially vertical member in a generally downward direction;

a first substantially horizontal member positioned adjacent to the first and second elongated substantially vertical members, the first substantially horizontal member having a front side and a rear side and having a channel formed in the rear side, the first substantially horizontal member being supported on or attached to the first and second collars such that movement of the first and second collars adjusts a vertical position of the first substantially horizontal member, the channel sized and configured to receive wiring for display devices;

a third collar and a fourth collar and a second substantially horizontal member;

the third collar moveably attached to the first elongated substantially vertical member, rotation of the third collar in the first direction moves the third collar along the at least one thread of the first elongated substantially vertical member in a generally upwards direction and rotation of the third collar in the second direction that is opposite the first direction moves the third collar along the at least one thread of the first elongated substantially vertical member in a generally downward direction;

the fourth collar moveably attached to the second elongated substantially vertical member, rotation of the fourth collar in the first direction moves the fourth collar along the at least one thread of the second elongated substantially vertical member in a generally upwards direction and rotation of the fourth collar in the second direction that is opposite the first direction moves the second collar along the at least one thread of the second elongated vertical member in a generally downward direction; and the second substantially horizontal member positioned adjacent to the first and second elongated substantially vertical member, the second substantially horizontal member having a front side and a rear side, the second substantially horizontal member being supported on or attached to the third and fourth collars such that movement of the third and fourth collars adjusts a vertical position of the second substantially horizontal member;

at least one quick release attachment mechanism attached to the first substantially horizontal member, and at least one quick release attachment mechanism attached to the second substantially horizontal member, each quick release attachment mechanism sized and configured to connect a display device to the first substantially horizontal member or the second substantially horizontal member; and wherein each of the quick release attachment mechanisms is comprised of a substantially horizontal member mounting portion that has an upper portion configured to engage an upper portion of the first substantially horizontal member or the second substantially horizontal member and a moveable member attached to the substantially horizontal member mounting portion, the moveable member moveable from a first position to a second position, the moveable member being biased to the first position, the moveable member engaging a bottom rear portion of the first substantially horizontal member or the second substantially horizontal member when in the first position and being moved away from the first substantially horizontal member or the second substantially horizontal member when in the second position such that the quick release attachment mechanism is removable from the first substantially horizontal member or second substantially horizontal member when the moveable member is in the second position, movement of the moveable member from the first position to the second position being actuated by a user without using a mechanical tool.

7. The support apparatus of claim 3 wherein the first substantially horizontal member is curved or arcuate in shape and has a groove positioned above the channel, the groove being separate from the channel and wherein the upper portion of the substantially horizontal member mounting portion engaging an upper portion of the first substantially horizontal member adjacent the groove, and the moveable member being directly attached to the substantially horizontal member mounting portion.

8. The support apparatus of claim 3 further comprising a first attachment mechanism and a second attachment mechanism, the first attachment mechanism attached to the first elongated substantially vertical member, the first attachment mechanism directly attaching the first elongated substantially vertical member to a substantially horizontal work surface, the second attachment mechanism attached to the second elongated substantially vertical member, the second attachment mechanism directly attaching the second elongated substantially vertical member to the substantially horizontal work surface or to a different substantially horizontal work surface.

9. The support apparatus of claim 3 further comprising at least one of: a wiring cover attached to the first substantially horizontal member adjacent to the channel, a cord manager attached to the first elongated substantially vertical member, and a cord manager attached to the second elongated substantially vertical member.

10. The support apparatus of claim 3 wherein the at least one quick release attachment mechanism being slidable along a length of the first substantially horizontal member when attached to the first substantially horizontal member, the at least one quick release attachment mechanism also configured such that the display device connected to the at least one quick release attachment mechanism is moveable via vertical pivoting, horizontal pivoting and rotation of the display device.

11. The support apparatus of claim 3 further comprising a first sleeve and a second sleeve, the first sleeve attached to the first substantially horizontal member and the second sleeve attached to the first substantially horizontal member, the first sleeve having an opening receiving a portion of the first elongated substantially vertical member, the second sleeve having an opening receiving a portion of the second elongated substantially vertical member, the first sleeve engaging or supported on the first collar and being moveable along a portion of the first elongated substantially vertical member when the first collar moves along the at least one thread of the first elongated substantially vertical member, the second sleeve engaging or supported on the second collar and being moveable along a portion of the second elongated substantially vertical member when the second collar moves along the at least one thread of the second elongated substantially vertical member.

12. The support apparatus of claim 3 wherein each of the at least one quick release attachment mechanism having a height adjustment mechanism that is sized and configured such that the display device is vertically adjustable via the height adjustment mechanism without movement of the first and second collars.

13. The support apparatus of claim 12 wherein the horizontal member mounting portion is coupled to the height adjustment mechanism for each of the at least one quick release attachment mechanism.

14. The support apparatus of claim 13 wherein the height adjustment mechanism is comprised of a connector that passes through a slot formed in the horizontal member mounting portion, the connector directly coupling the horizontal member mounting portion to the height adjustment mechanism, the connector being vertically moveable within the slot to a plurality of different positions.

15. The support apparatus of claim 14 wherein each of the plurality of different positions to which the connector is positionable within the slot is defined by one of teeth, projections, structure adjacent to the slot, and steps defined by or attached to the horizontal member mounting portion.

16. A support apparatus comprising:
a first elongated substantially vertical member having at least one thread;
a second elongated substantially vertical member having at least one thread;
a first collar moveably attached to the first elongated vertical member, rotation of the first collar in a first direction moves the first collar along the at least one thread of the first elongated substantially vertical member in a generally upwards direction and rotation of the first collar in a second direction that is opposite the first direction moves the first collar along the at least one thread of the first elongated substantially vertical member in a generally downward direction;
a second collar moveably attached to the second elongated vertical member, rotation of the second collar in the first direction moves the second collar along the at least one thread of the second elongated substantially vertical member in a generally upwards direction and rotation of the second collar in the second direction that is opposite the first direction moves the second collar along the at least one thread of the second elongated substantially vertical member in a generally downward direction;
a first substantially horizontal member positioned adjacent to the first and second elongated substantially vertical members, the first substantially horizontal member having a front side and a rear side and having a channel formed in the rear side, the first substantially horizontal member being supported on or attached to the first and second collars such that movement of the first and second collars adjusts a vertical position of the first substantially horizontal member, the channel sized and configured to receive wiring for display devices; and
at least one quick release attachment mechanism, each of the at least one quick release attachment mechanisms having a monitor mounting portion attached to a horizontal member mounting portion, the monitor mounting portion having a height adjustment mechanism sized and configured such that the display device is vertically adjustable via the height adjustment mechanism without movement of the first and second collars;
the horizontal member mounting portion having an upper portion configured to engage an upper portion of the first substantially horizontal member and a moveable member moveable from a first position to a second position, the moveable member being biased to the first position, the moveable member engaging a bottom rear portion of the first substantially horizontal member below the channel when in the first position to attach the at least one quick release attachment mechanism to the first substantially horizontal member and being moved away from the first substantially horizontal member when in the second position such that the quick release attachment mechanism is separable from the first substantially horizontal member when the moveable member is in the second position, movement of the moveable member being actuated by a user without using a mechanical tool.

17. The support apparatus of claim 16 wherein the height adjustment mechanism is comprised of a connector that passes through a slot formed in the horizontal member mounting portion, the connector directly attaching the monitor mounting portion to the horizontal member mounting portion, the connector being vertically moveable within the slot to a plurality of different positions.

18. The support apparatus of claim 16 wherein the monitor mounting portion is moveably attached to the horizontal member mounting portion.

19. The support apparatus of claim 16 wherein the first substantially horizontal member is a curved member that is positioned so that the curved member is level.

20. A support apparatus for supporting display devices above a work surface comprising:
a first elongated substantially vertical member having at least one thread extending from adjacent a first end of the first elongated substantially vertical member to adjacent a second end of the first elongated substantially vertical member;
a second elongated substantially vertical member having at least one thread extending from adjacent a first end of the second elongated substantially vertical member to adjacent a second end of the second elongated substantially vertical member;
a first collar moveably attached to the first elongated vertical member, rotation of the first collar in a first direction moves the first collar along the at least one thread of the first elongated substantially vertical member in a generally upwards direction and rotation of the first collar in a second direction that is opposite the first direction moves the first collar along the at least one thread of the first elongated substantially vertical member in a generally downward direction;
a second collar moveably attached to the second elongated vertical member, the second collar configured such that rotation of the second collar in a first direction moves the second collar along the at least one thread of the second elongated substantially vertical member in a generally upwards direction and rotation of the second collar in a second direction that is opposite the first direction moves the second collar along the at least one thread of the second elongated substantially vertical member in a generally downward direction;
a first substantially horizontal member positioned adjacent to the first and second elongated substantially vertical members, the first substantially horizontal member having a front side and a rear side, the first substantially horizontal member being supported on or attached to the first and second collars such that movement of the first and second collars adjusts a vertical position of the first substantially horizontal member, the first substantially horizontal member sized for attachment to a plurality of display devices.

21. The support apparatus of claim 20 further comprising:
a first set screw that extends through the first collar for engagement with the first elongated substantially vertical member, the first set screw being adjustable for releasably locking a position of the first collar along the first elongated substantially vertical member; and
a second set screw that extends through the second collar for engagement with the second elongated substantially vertical member, the second set screw being adjustable for releasably locking a position of the second collar along the second elongated substantially vertical member.

22. The support apparatus of claim 3 further comprising:

a first set screw that extends through the first collar for engagement with the first elongated substantially vertical member, the first set screw being adjustable for releasably locking a position of the first collar along the first elongated substantially vertical member; and a second set screw that extends through the second collar for engagement with the second elongated substantially vertical member, the second set screw being adjustable for releasably locking a position of the second collar along the second elongated substantially vertical member.

23. The support apparatus of claim 6 further comprising:

a first set screw that extends through the first collar for engagement with the first elongated substantially vertical member, the first set screw being adjustable for releasably locking a position of the first collar along the first elongated substantially vertical member; and a second set screw that extends through the second collar for engagement with the second elongated substantially vertical member, the second set screw being adjustable for releasably locking a position of the second collar along the second elongated substantially vertical member.

24. The support apparatus of claim 16 further comprising:

a first set screw that extends through the first collar for engagement with the first elongated substantially vertical member, the first set screw being adjustable for releasably locking a position of the first collar along the first elongated substantially vertical member; and a second set screw that extends through the second collar for engagement with the second elongated substantially vertical member, the second set screw being adjustable for releasably locking a position of the second collar along the second elongated substantially vertical member.

\* \* \* \* \*